H. F. SHINDEL.
FRAME EDGING FOR GOGGLES.
APPLICATION FILED AUG. 6, 1918.
1,306,357.
Patented June 10, 1919.
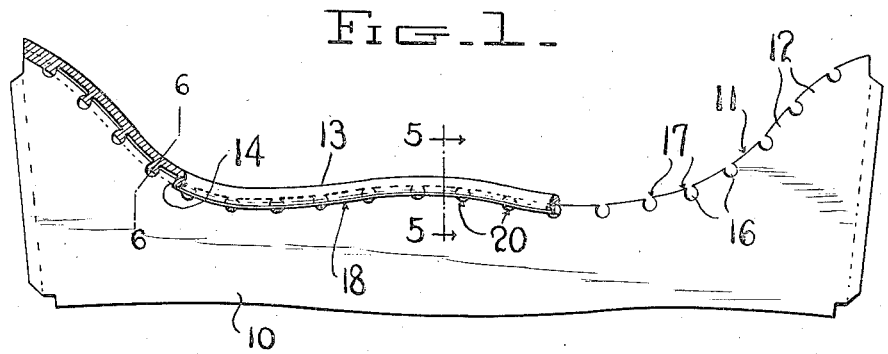
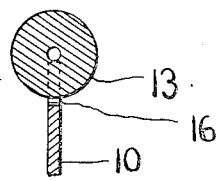
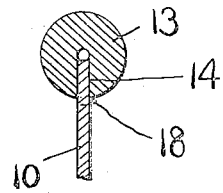
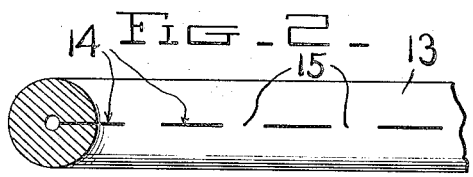
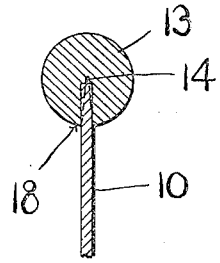
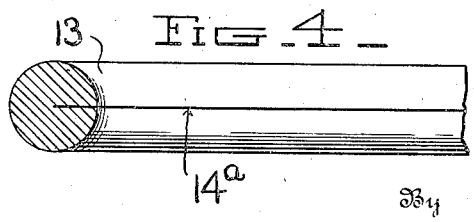
Harry F. Shindel
Inventor
By W. G. D. M. Stewart
Attorney

UNITED STATES PATENT OFFICE.

HARRY F. SHINDEL, OF READING, PENNSYLVANIA, ASSIGNOR TO T. A. WILLSON & CO., INC., OF READING, PENNSYLVANIA, A CORPORATION OF PENNSYLVANIA.

FRAME-EDGING FOR GOGGLES.

1,306,357.  Specification of Letters Patent.  Patented June 10, 1919.

Application filed August 6, 1918. Serial No. 248,618.

*To all whom it may concern:*

Be it known that I, HARRY F. SHINDEL, a citizen of the United States, residing at Reading, in the county of Berks and State of Pennsylvania, have invented certain new and useful Improvements in Frame-Edgings for Goggles, of which the following is a specification.

My invention relates particularly to framings such as are employed for goggles or eye cups requiring a suitable edging to provide proper facial contact; and it consists in the improved connection of a separately formed edging to a specially formed framing edge which is fully described in connection with the accompanying drawing, and the novel features of which are clearly defined in the claims.

Figure 1 is a developed view of a sheet-material framing such as is employed for the eye-cup set forth in my pending application Serial No. 232,855, but showing my present invention applied thereto.

Figs. 2, 3, and 4 are views of the edging strip employed, showing slight modifications in the provision made for engaging the serrated framing edge.

Fig. 5 is a cross-sectional view on the line 5—5 of Fig. 1; Fig. 6, is a similar view on the line 6—6 thereof; and Fig. 7 is a similar view to Fig. 5, but showing the modified edging of Fig. 4.

The sheet-material framing 10 as shown, is formed with a sinuate edge 11 as required to provide facial contact around the eye socket in an eye cup, and my invention is illustrated as applied thereto in preferred manner though not limited to such specific application.

The invention consists essentially in forming the edge 11 with a series of serrations 12 adapted to retainingly engage a separate edging strip 13 which is suitably slitted as at 14 to forcibly receive them. This edging strip is preferably approximately round in cross-section, and of elastic material such as rubber so as to permit of required manipulation for satisfactorily engaging it with the serrations 12 by means of the slitting 14 provided to receive the latter. The slitting 14 of the edging strip extends radially to about the center thereof, and is preferably formed by separate cuts corresponding in number with the serrations 12, and arranged in line along the length of the strip with uncut portions 15 between them adapted to be forced into the framing edge spacings 16 between the serrations 12 in engaging the edging with the latter.

The serrations 12 have engaging points 17 overhanging the intervening spacings 16, so as to securely retain the applied edging strip. As shown in Fig. 1 these serrations are formed by simply drilling or punching a series of spacing holes 16 having their centers located somewhat less than their radius from that edge of the sheet material framing strip 10 which is to be provided with the edging 13 thereby cutting through said edge of the strip and forming serrations 12 having oppositely extending points 17 between which the portions 15 of the edging are engaged in the spacings 16. In thus engaging the edging 13 it is slightly stretched in each slitted portion which successively receives a serration so as to permit of easily entering an unslitted portion 15 of the edging in each spacing 16 and thereby firmly securing the edging.

A determined length of rubber tubing may be very conveniently employed for the edging 13, as indicated in Fig. 2, the separated slits 14 extending radially through the wall to the central opening; but a solid strip may be employed with similar separated slits 14 as indicated in Fig. 3; or this slitting may be continuous as indicated at 14ᵃ in Fig. 4, dependence for proper retaining effect in such case being upon the lateral closing together of the material of the edging into the interdental spacings 16, as indicated in Fig. 7.

In engaging such edging 13 with the serrations, it may be readily stretched in each slitted portion which receives a serration so as to facilitate entering the unslitted portions 15 successively in each spacing 16 wherein it is securely retained by the overhanging points 17. As shown, these spacings 16 are preferably made deep enough to extend below the applied edging 13 and provide ornamental openings 20 below the latter, which openings are also adapted to serve for ventilation of the eye cups particularly referred to. The edging shown in Fig. 1 may be either tubular or solid as indicated, its opposite ends being in either case adapted to closely abut when the framing blank shown is folded to eye cup form. The particularly described form of the serrations may be modified, and the application of my invention be otherwise varied within the scope of the invention as defined in the claims.

What I claim is:

1. A frame for goggles or the like having an edge portion formed with spaced-apart teeth, and a separately formed longitudinally-slitted edging of elastic material retained thereon by engagement of the teeth in the slitted edging.

2. A frame for goggles or the like having an edge portion formed with spaced-apart teeth, and a separately formed longitudinally-slitted tubular edging of elastic material thereon: the spaced-apart teeth being passed through the slit of the tubular edging to retainingly engage the latter.

3. A frame for goggles or the like having an edge portion formed with spaced-apart teeth having reversely extending points overhanging the interdental spaces, and a separately formed edging of elastic material having a series of spaced-apart longitudinal slits retainingly engaged by the successive teeth.

4. A frame for goggles or the like having an edge portion formed with spaced-apart teeth having reversely extending points overhanging the interdental spaces, and a separately formed tubular edging of elastic material having a series of spaced apart longitudinal slits in which the successive teeth are respectively engaged.

5. In combination with a serrated frame edge, a separately formed edging strip secured thereto, said strip being of approximately circular cross-section and radially slitted to receive and be retainingly engaged by said serrated edge, and the spaces between the serrations in said edge extending below the engaged edging.

6. A sheet-material frame having an edge formed with a series of teeth each having a pointed portion overhanging an interdental space, and a separately formed edging strip slitted to receive said serrations and to be retainingly engaged thereby.

In testimony whereof I affix my signature.

HARRY F. SHINDEL.